(12) United States Patent
Kim et al.

(10) Patent No.: US 8,385,015 B2
(45) Date of Patent: Feb. 26, 2013

(54) METHOD OF OPERATING PRE-AMPLIFIER, PRE-AMPLIFIER, AND APPARATUSES INCLUDING THE SAME

(75) Inventors: Myoung Mee Kim, Seongnam-si (KR); Kyung Ho Hong, Osan-si (KR)

(73) Assignee: Seagate Technology LLC, Cupertino, CA (US)

( * ) Notice: Subject to any disclaimer, the term of this patent is extended or adjusted under 35 U.S.C. 154(b) by 15 days.

(21) Appl. No.: 12/855,732

(22) Filed: Aug. 13, 2010

(65) Prior Publication Data

US 2011/0038071 A1    Feb. 17, 2011

(30) Foreign Application Priority Data

Aug. 14, 2009    (KR) .................. 10-2009-0075249

(51) Int. Cl.
*G11B 5/09* (2006.01)
*G11B 5/02* (2006.01)

(52) U.S. Cl. ............................................. 360/46; 360/68
(58) Field of Classification Search ................. None
See application file for complete search history.

(56) References Cited

U.S. PATENT DOCUMENTS

| 7,595,949 B1 * | 9/2009 | Wallash et al. ............... 360/46 |
| 2006/0097761 A1 * | 5/2006 | Stein et al. ................ 327/110 |

FOREIGN PATENT DOCUMENTS

| JP | 10-105912 A | 4/1998 |
| JP | 11-250409 A | 9/1999 |
| JP | 2001-273603 A | 10/2001 |
| KR | 10-0699878 B1 | 8/2010 |

* cited by examiner

*Primary Examiner* — Regina N Holder
(74) *Attorney, Agent, or Firm* — Cesari & Reed, LLP; Kirk A. Cesari (57) ABSTRACT

A method of operating a pre-amplifier of a hard disk drive is provided. The method includes generating a comparison signal corresponding to a result of comparing a reference signal with a difference between differential signals corresponding to write data, and controlling transmission of the differential signals to a write head in response to the comparison signal.

18 Claims, 8 Drawing Sheets

METHOD OF OPERATING PRE-AMPLIFIER, PRE-AMPLIFIER, AND APPARATUSES INCLUDING THE SAME

CROSS-REFERENCE TO RELATED APPLICATION

This application claims priority from Korean Patent Application No. 10-2009-0075249, filed Aug. 14, 2009, in the Korean Intellectual Property Office (KIPO), the entire contents of which are incorporated herein by reference.

SUMMARY

Methods and apparatuses consistent with the exemplary embodiments relate to a pre-amplifier, and more particularly, to a pre-amplifier for preventing DC write, a method of operating the same, and apparatuses including the same.

Hard disk drives (HDDs) are widely used as data storage devices. To increase the reliability of write data, the write data needs to be correctly written to a disk of an HDD. When the write data is not correctly written to the disk due to various factors, it may be difficult to reproduce the write data in a read operation.

One or more exemplary embodiments provide a pre-amplifier for preventing DC write, a method of operating the same, and apparatuses including the same.

According to one or more exemplary embodiments, there is provided a method of operating a pre-amplifier of a hard disk drive. The method includes generating a comparison signal as a result of comparing a difference between differential signals corresponding to write data with a reference signal and permitting or interrupting transmission of the differential signals to a write head in response to the comparison signal.

The generating the comparison signal may include detecting the difference between the differential signals, generating the reference signal corresponding to a digital code, and generating the comparison signal corresponding to the result of comparing the difference with the reference signal.

According to an exemplary embodiment, there is provided a pre-amplifier of a hard disk drive including a driver configured to drive differential signals corresponding to write data and a control circuit configured to generate a write control signal according to a result of comparing a difference between the differential signals with a reference signal. Here, the driver is enabled or disabled in response to the write control signal.

The control circuit may include a difference detector configured to detect the difference between the differential signals, a digital-to-analog converter configured to generate the reference signal corresponding to a digital code, a comparator configured to generate a comparison signal corresponding to the result of comparing the difference output from the difference detector with the reference signal, and a latch configured to latch the comparison signal to output the write control signal. The latch may be initialized in response to a read enable signal instructing a read operation of the pre-amplifier.

According to an exemplary embodiment, there is provided a pre-amplifier of a hard disk drive including a driver configured to drive differential signals corresponding to write data and a control circuit configured to permit or interrupt transmission of output signals of the driver to a write head according to a result of comparing a difference between the differential signals with a reference signal.

The control circuit may include a difference detector configured to detect the difference between the differential signals, a digital-to-analog converter configured to generate the reference signal corresponding to a digital code, a comparator configured to generate a comparison signal corresponding to the result of comparing an output signal of the difference detector with the reference signal, a latch configured to latch the comparison signal output from the comparator to output a write control signal, and a switching circuit configured to permit or interrupt the transmission of the output signals of the driver to the write head in response to the write control signal output from the latch. The latch may be initialized in response to a read enable signal instructing a read operation of the pre-amplifier.

According to an exemplary embodiment, a hard disk drive includes a magnetic recording medium, a write head configured to write write signals to the magnetic recording medium, and a pre-amplifier configured to provide the write signals to the write head. The pre-amplifier includes a driver configured to drive differential signals corresponding to write data to generate the write signals and a control circuit configured to permit or interrupt transmission of the write signals to the write head according to a result of comparing a difference between the differential signals with a reference signal.

The control circuit may include a difference detector configured to detect the difference between the differential signals, a digital-to-analog converter configured to generate the reference signal corresponding to a digital code, a comparator configured to generate a comparison signal corresponding to the result of comparing an output signal of the difference detector with the reference signal, a latch configured to latch the comparison signal output from the comparator, and a switching circuit configured to permit or interrupt the transmission of the write signals to the write head in response to an output signal of the latch.

The hard disk drive may further include a processor configured to transmit the digital code for controlling a level of the reference signal to the pre-amplifier.

According to an exemplary embodiment, there is provided a computer system which includes a hard disk drive and a main processor configured to control a write operation of the hard disk drive. The hard disk drive includes a magnetic recording medium, a write head configured to write write signals to the magnetic recording medium, and a pre-amplifier configured to provide the write signals to the write head. The pre-amplifier includes a driver configured to drive differential signals corresponding to write data output from the main processor to generate the write signals and a control circuit configured to permit or interrupt transmission of the write signals to the write head according to a result of comparing a difference between the differential signals with a reference signal.

The control circuit may include a difference detector configured to detect the difference between the differential signals, a digital-to-analog converter configured to generate the reference signal corresponding to a digital code, a comparator configured to generate a comparison signal corresponding to the result of comparing an output signal of the difference detector with the reference signal, a latch configured to latch the comparison signal output from the comparator, and a switching circuit configured to permit or interrupt the transmission of the write signals to the write head in response to an output signal of the latch. The computer system may further include a non-volatile memory device. At this time, the main processor may also control an operation of the non-volatile memory device.

According to an exemplary embodiment, there is provided a method of operating a pre-amplifier of a hard disk drive, including comparing a reference signal and a difference between differential signals, generating a comparison signal that corresponds to a result of the comparing, and controlling transmission of the differential signals according to the comparison signal.

According to an exemplary embodiment, there is provided a pre-amplifier including a driver configured to drive differential signals, and a control circuit configured to generate a write control signal according to a result of comparing a difference between the differential signals with a reference signal, wherein the driver is controlled according to the write control signal.

According to an exemplary embodiment, there is provided a pre-amplifier of a hard disk drive including a driver configured to drive differential signals, and a control circuit configured to control transmission of output signals from the driver to a write head according to a result of comparing a reference signal with a difference between the differential signals.

BRIEF DESCRIPTION OF THE DRAWINGS

The above and other aspects will become more apparent by describing in detail exemplary embodiments with reference to the attached drawings in which.

DETAILED DESCRIPTION OF THE EXEMPLARY EMBODIMENTS

Exemplary embodiments now will be described more fully hereinafter with reference to the accompanying drawings. The exemplary embodiments may, however, be embodied in many different forms and should not be construed as limited to the exemplary embodiments set forth herein. Rather, these exemplary embodiments are provided so that this disclosure will be thorough and complete. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
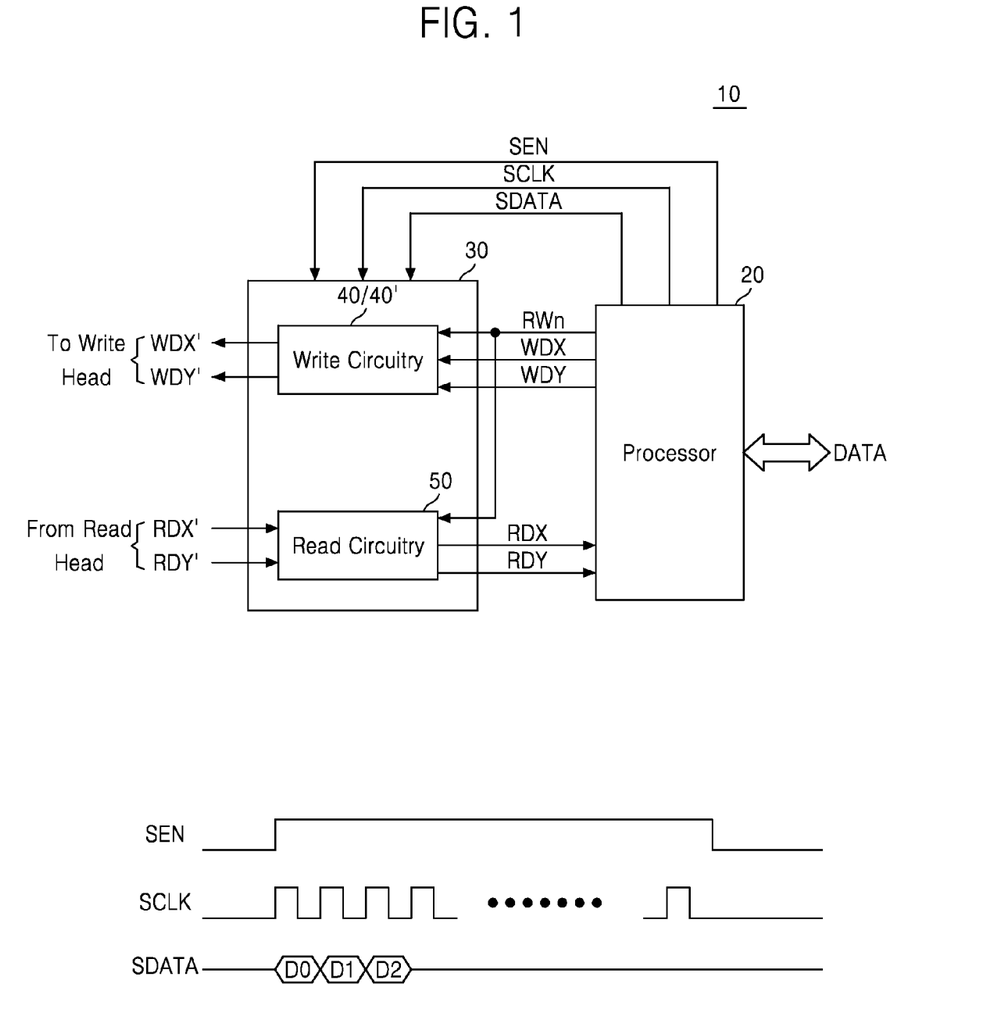
FIG. 1 is a block diagram of a data processing apparatus including a pre-amplifier according to one or more exemplary embodiments.

FIG. 1 is a block diagram of a data processing apparatus 10 including a pre-amplifier 30 according to an exemplary embodiment. The data processing apparatus 10 includes a processor 20 and the pre-amplifier 30. The data processing apparatus 10 may be implemented as a part of a hard disk drive (HDD).

In a write operation, the processor 20 receives write data DATA output from a main processor (e.g., a central processing unit (CPU) or a host), converts the write data DATA into various signals RWn, WDX, WDY, SDATA, SCLK, and SEN that can be processed by the pre-amplifier 30, and transmits the signals RWn, WDX, WDY, SDATA, SCLK, and SEN to the pre-amplifier 30. The signal SDATA is a serial data signal transmitted to the pre-amplifier 30 in response to the serial clock signal SCLK and the signal SEN is an enable signal. When the enable signal SEN is activated to a high level, the pre-amplifier 30 receives and decodes the serial data signal SDATA input in response to the serial clock signal SCLK and operates according to a result of the decoding.

The signal RWn is an access signal instructing an access operation. The pre-amplifier 30 performs a write operation in response to the access signal RWn at a first level (e.g., a low level) and performs a read operation in response to the access signal RWn at a second level (e.g., a high level). The signals WDX and WDY are differential signals corresponding to the write data DATA.

In a read operation, the processor 20 receives differential signals RDX and RDY output from the pre-amplifier 30, converts the differential signals RDX and RDY into read data that can be processed by a main processor (e.g., a CPU or a host), and transmits the read data to the main processor. The differential signals RDX and RDY correspond to signals RDX' and RDY' read from a magnetic recording medium, e.g., a disk.

In the write operation, when a difference between the differential signals WDX and WDY is lower than a reference signal, the pre-amplifier 30 prevents write signals corresponding to the differential signals WDX and WDY from being written to a magnetic recording medium, e.g., a disk, that is, the pre-amplifier 30 prevents a DC write operation. The data processing apparatus 10 including the pre-amplifier 30 having a function of preventing the DC write operation increases the reliability of data written to the disk.

The pre-amplifier 30 includes a write circuit 40/40' and a read circuit 50. The write circuit 40/40' is enabled in response to the access signal RWn at the low level and the read circuit 50 is enabled in response to the access signal RWn at the high level.

In a normal write operation, the write circuit 40/40' processes (e.g., buffers, amplifies, or drives) the differential signals WDX and WDY corresponding to the write data DATA and transmits processed differential signals WDX' and WDY' to a write head (not shown). In a normal read operation, the read circuit 50 receives the differential signals RDX' and RDY' read by a read head (not shown) from a disk, processes (e.g., buffers, amplifies, or drives) the differential signals RDX' and RDY', and transmits the processed differential signals RDX and RDY to the processor 20.

Figure 2:
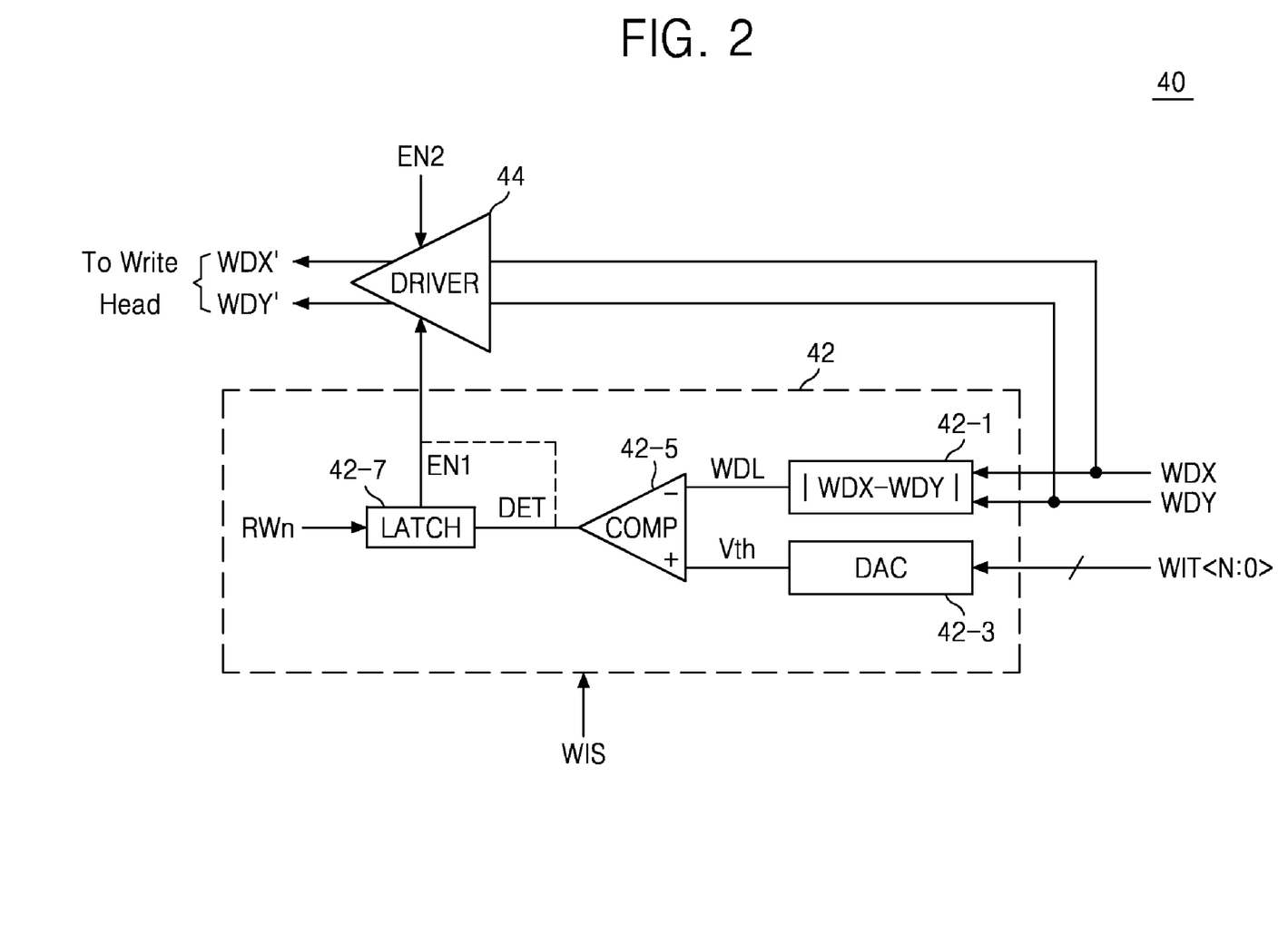
FIG. 2 is a block diagram of a write circuit included in the pre-amplifier illustrated in FIG. 1 according to one or more exemplary embodiments.

FIG. 2 is a block diagram of the write circuit 40 included in the pre-amplifier illustrated in FIG. 1 according to some exemplary embodiments. Referring to FIG. 2, the write circuit 40 includes a control circuit 42 and a driver 44. Despite the name, the driver 44 indicates at least one circuit that can process, e.g., buffer or drive, the differential signals WDX and WDY.

The control circuit 42 generates a write control signal DET or EN1 according to a result of comparing a difference WDL between the differential signals WDX and WDY corresponding to the write data DATA with a reference signal Vth. The driver 44 processes the differential signals WDX and WDY and transmits the processed differential signals WDX' and WDY' to the write head. The driver 44 may be enabled or disabled in response to the write control signal DET or EN1. Alternatively, the driver 44 may be enabled or disabled in response to the write control signal DET or EN1 and a write active signal EN2. The write active signal EN2 may be included in the serial data signal SDATA to be transmitted from the processor 20.

The control circuit 42 includes a difference detector 42-1, a digital-to-analog converter (DAC) 42-3, a comparator 42-5. The difference detector 42-1 detects a difference (i.e., WDX-WDY or WDY-WDX) between the differential signals WDX and WDY and outputs a signal WDL corresponding to the difference.

The DAC 42-3 generates the reference signal Vth corresponding to a digital code WIT<N:0>. The digital code WIT<N:0> may be included in the serial data signal SDATA to be transmitted from the processor 20. For instance, the DAC 42-3 may generate the reference signal Vth of 70 mV, 140 mV, 280 mV, or 400 mV when the digital code WIT<1:0> is "00", "01", "10", or "11", respectively. At this time, 70 mV, 140 mV, 280 mV, and 400 mV may indicate DC voltages or peak-to-peak voltages of an oscillating signal. The frequency of the oscillating signal may be the same as that of each of the differential signals WDX and WDY.

The comparator 42-5 generates the comparison signal DET corresponding to the result of comparing the signal WDL output from the difference detector 42-1 with the reference signal Vth output from the DAC 42-3. The comparison signal DET is a write control signal and may be directly transmitted to the driver 44. The polarities (or signs) of input terminals (− and +) of the comparator 42-5 are shown in FIG. 2 for clarity of the description and may be opposite in other exemplary embodiments.

The comparison signal DET may be directly transmitted to the driver 44 or may be transmitted to the driver 44 via a latch 42-7 as illustrated in FIG. 2. The latch 42-7 latches the comparison signal DET. At this time, the driver 44 is enabled or disabled in response to the write control signal EN1 output from the latch 42-7. The latch 42-7 is initialized in response to the active signal RWn at the high level, which instructs a read operation of the pre-amplifier 30.

The control circuit 42 is enabled or disabled in response to an enable signal WIS. When the control circuit 42 is enabled in response to the enable signal WIS at one level between a low level and a high level, the driver 44 may selectively transmit the output signals WDX' and WDY' to the write head. When the control circuit 42 is disabled in response to the enable signal WIS at another level between the low and the high levels, the driver 44 may unconditionally transmit the output signals WDX' and WDY' to the write head.

Figure 3:
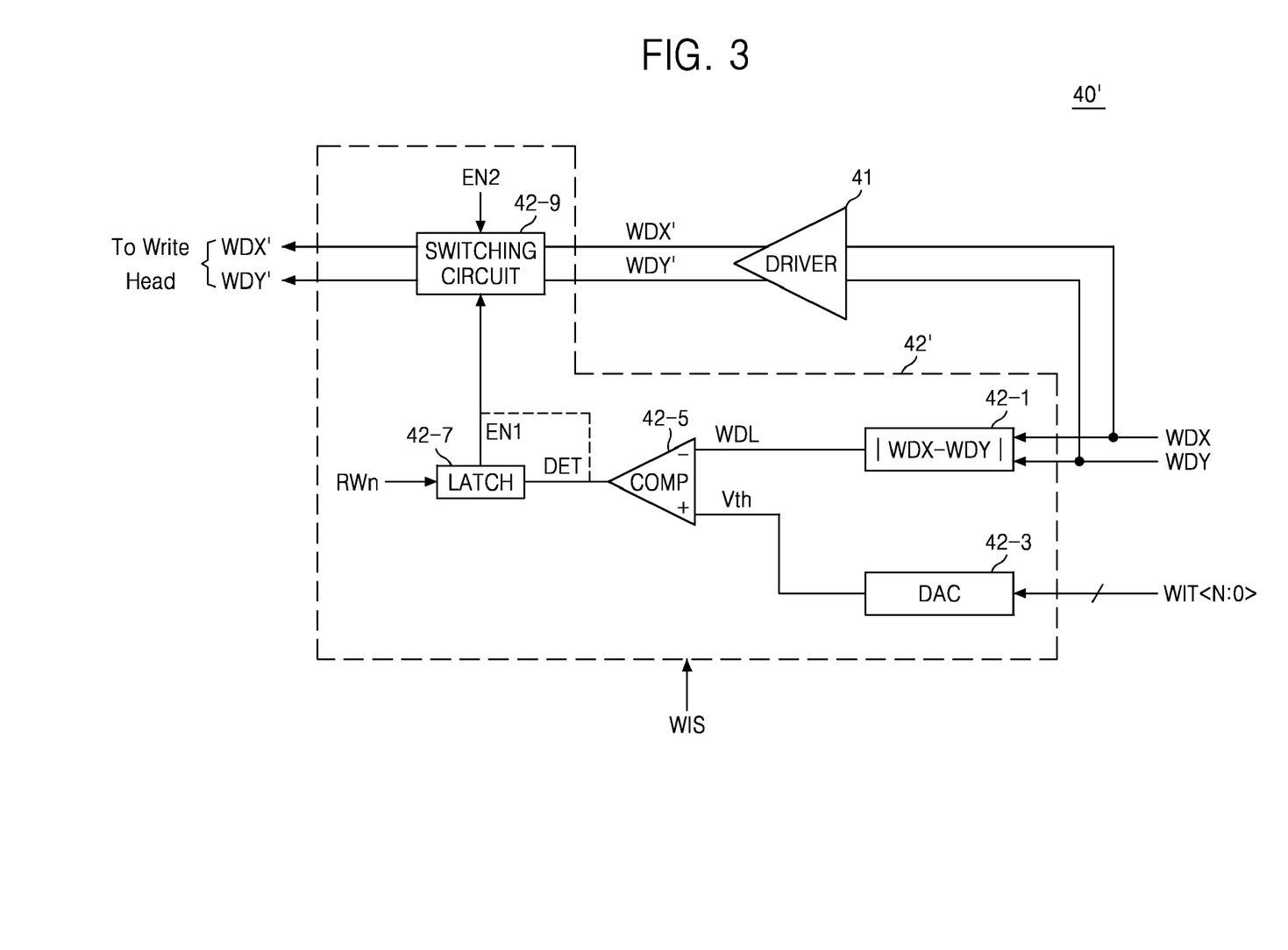
FIG. 3 is a block diagram of a write circuit included in the pre-amplifier illustrated in FIG. 1 according to one or more exemplary embodiments.

FIG. 3 is a block diagram of the write circuit 40' included in the pre-amplifier 30 illustrated in FIG. 1 according to another exemplary embodiment. Referring to FIG. 3, the write circuit 40' includes a driver 41 and a control circuit 42'. The driver 41 processes the differential signals WDX and WDY corresponding to the write data DATA and outputs the processed differential signals WDX' and WDY' to the write head via a switching circuit 42-9.

The control circuit 42' permits or interrupts the transmission of the output signals WDX' and WDY' of the driver 41 to the write head according to a result of comparing the difference WDL between the differential signals WDX and WDY with the reference signal Vth. Apart from the driver 41 and the switching circuit 42-9, the write circuit 40' illustrated in FIG. 3 is substantially the same as the write circuit 40 illustrated in FIG. 2. In other words, while the write circuit 40 illustrated in FIG. 2 enables/disables the driver 44, the write circuit 40' illustrated in FIG. 3 enables/disables the switching circuit 42-9. The switching circuit 42-9 switches the connection of the driver 41 to the write head in response to the output signal DET of the comparator 42-5 when a write control signal or the latch 42-7 is not provided or in response to the output signal EN1 of the latch 42-7 when the latch 42-7 is provided.

The control circuit 42' is enabled or disabled in response to the enable signal WIS. When the control circuit 42' is enabled in response to the enable signal WIS at one of the low and the high levels, the switching circuit 42-9 may selectively transmit the output signals WDX' and WDY' of the driver 41 to the write head. When the control circuit 42' is disabled in response to the enable signal WIS at the other of the low and the high levels, the switching circuit 42-9 may unconditionally transmit the output signals WDX' and WDY' of the driver 41 to the write head.

Figure 4:
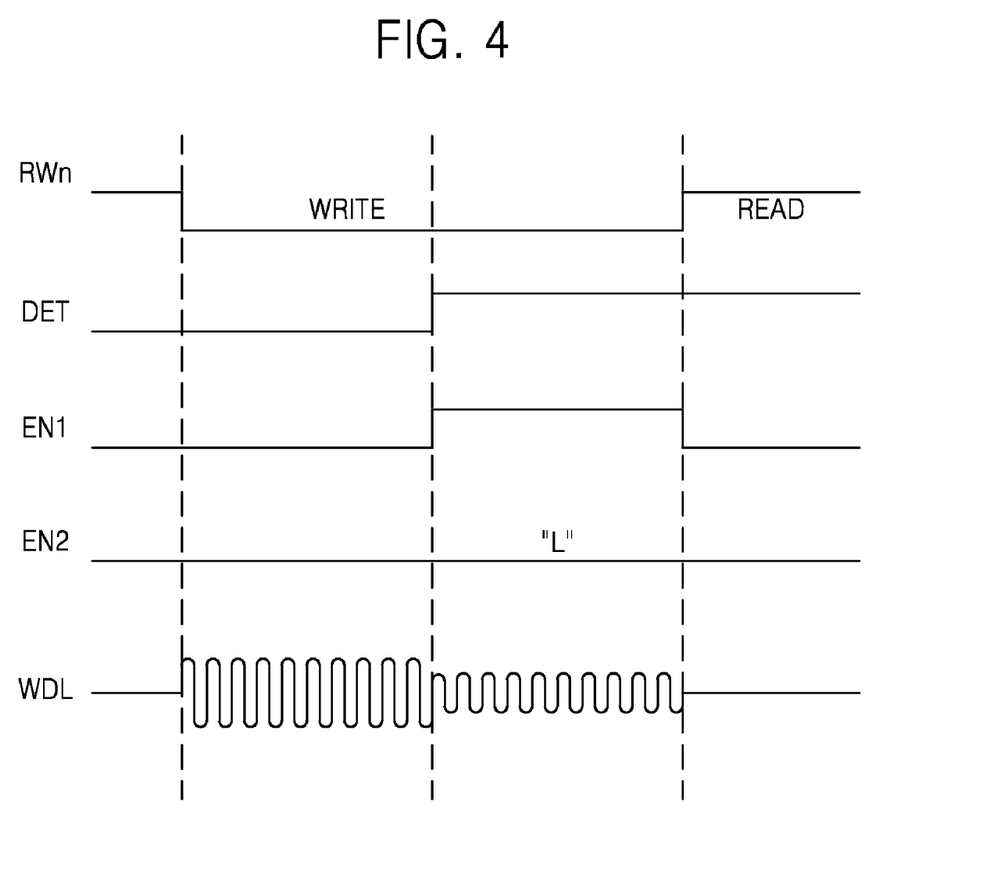
FIG. 4 is a timing diagram of the operation of the write circuit illustrated in FIG. 2 or FIG. 3 according to one or more exemplary embodiments.

FIG. 4 is a timing chart of the operation of the write circuit 40 illustrated in FIG. 2 or FIG. 3 according to some exemplary embodiments. Referring to FIGS. 1, 2, and 4, when the write active signal EN2 is at the low level, the write circuit 40 operates as follows.

When the access signal RWn is at the low level, that is, in a write operation, if the difference WDL between the differential signals WDX and WDY is higher than the reference signal Vth, the comparator 42-5 outputs the comparison signal DET at the low level. Since the output signal DET (=EN1) of the comparator 42-5 or the output signal EN1 of the latch 42-7 is at the low level, the driver 44 is turned on or enabled in response to the write control signal DET or EN1 at the low level. The driver 44 processes the differential signals WDX and WDY and outputs the processed differential signals WDX' and WDY' to the write head. The write head normally writes the differential signals WDX' and WDY' to a disk in the write operation.

However, if the difference WDL between the differential signals WDX and WDY is lower than the reference signal Vth, the comparator 42-5 outputs the comparison signal DET at the high level, and therefore, the output signal EN1 of the latch 42-7 is at the high level. Accordingly, the driver 44 is turned off or disabled in response to the write control signal DET or EN1 at the high level. At this time, the driver 44 does not output the differential signals WDX and WDY, and therefore, the write head does not perform writing.

When the access signal RWn changes from the low level to the high level for a read operation, data stored in the latch 42-7, i.e., a bit value (e.g., 0 or 1) corresponding to the output signal DET of the comparator 42-5 is initialized. In other words, the output signal EN1 of the latch 42-7 changes to the low level. After the read operation is completed, a write operation newly begins with the comparison of the difference WDL between differential signals WDX and WDY and the reference signal Vth.

The operation of the write circuit 40' when the write active signal EN2 is at the low level will be described with reference to FIGS. 1, 3, and 4. When the access signal RWn is at the low level, that is, in a write operation, if the difference WDL between differential signals WDX and WDY is higher than the reference signal Vth, the comparator 42-5 outputs the comparison signal DET at the low level, and therefore, the output signal EN1 of the latch 42-7 is at the low level.

The switching circuit 42-9 is turned on or enabled in response to the write control signal DET or EN1 at the low level. The driver 41 processes the differential signals WDX and WDY and outputs the processed differential signals WDX' and WDY' to the switching circuit 42-9. The switching circuit 42-9 transmits the differential signals WDX' and WDY' output from the driver 41 to the write head. The write head normally writes the differential signals WDX' and WDY' to a disk in the write operation.

However, if the difference WDL between the differential signals WDX and WDY is lower than the reference signal Vth, the comparator 42-5 outputs the comparison signal DET at the high level, and therefore, the output signal EN1 of the latch 42-7 is at the high level. Accordingly, the switching circuit 42-9 is turned off or disabled in response to the write control signal DET or EN1 at the high level and does thus not transmit the differential signals WDX' and WDY' output from the driver 41. As a result, the write head does not perform writing.

When the access signal RWn changes from the low level to the high level for a read operation, data stored in the latch 42-7 is initialized. In other words, the output signal EN1 of the latch 42-7 changes to the low level. After the read operation is completed, a write operation newly begins with the comparison of the difference WDL between differential signals WDX and WDY and the reference signal Vth.

Figure 5:
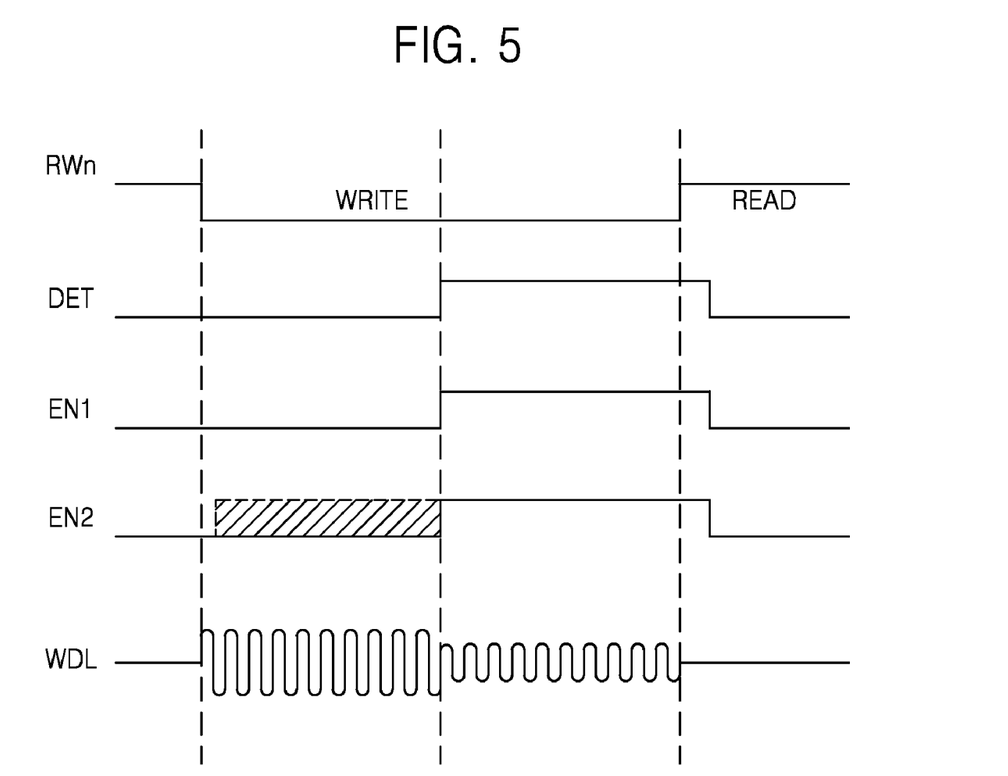
FIG. 5 is a timing diagram of the operation of the write circuit illustrated in FIG. 2 or FIG. 3 according to one or more exemplary embodiments.

FIG. 5 is a timing chart of the operation of the write circuit 40 illustrated in FIG. 2 or FIG. 3 according to another exemplary embodiment. The operation of the write circuit 40 when the write control signal DET or EN1 and the write active signal EN2 are at the high level will be described with reference to FIGS. 1, 2, and 5.

If the difference WDL between the differential signals WDX and WDY is lower than the reference signal Vth, the comparator 42-5 outputs the comparison signal DET at the high level, and therefore, the output signal EN1 of the latch 42-7 is at the high level. Accordingly, the driver 44 is turned on or enabled in response to the write control signal DET or EN1 and the write active signal EN2 and thus processes the differential signals WDX and WDY and outputs the processed differential signals WDX' and WDY' to the write head. As a result, the write head writes the differential signals WDX' and WDY' to a disk in a normal write operation.

The operation of the write circuit 40' when the write control signal DET or EN1 and the write active signal EN2 are at the high level will be described with reference to FIGS. 1, 3, and 5.

If the difference WDL between the differential signals WDX and WDY is lower than the reference signal Vth, the comparator 42-5 outputs the comparison signal DET at the high level, and therefore, the output signal EN1 of the latch 42-7 is at the high level. Accordingly, the switching circuit 42-9 is turned on or enabled in response to the write control signal DET or EN1 and the write active signal EN2 and thus transmits the differential signals WDX' and WDY' output from the driver 41 to the write head. As a result, even if the difference WDL between the differential signals WDX and WDY is lower than the reference signal Vth, the write head writes the differential signals WDX' and WDY' to a disk in a normal write operation.

Figure 6:
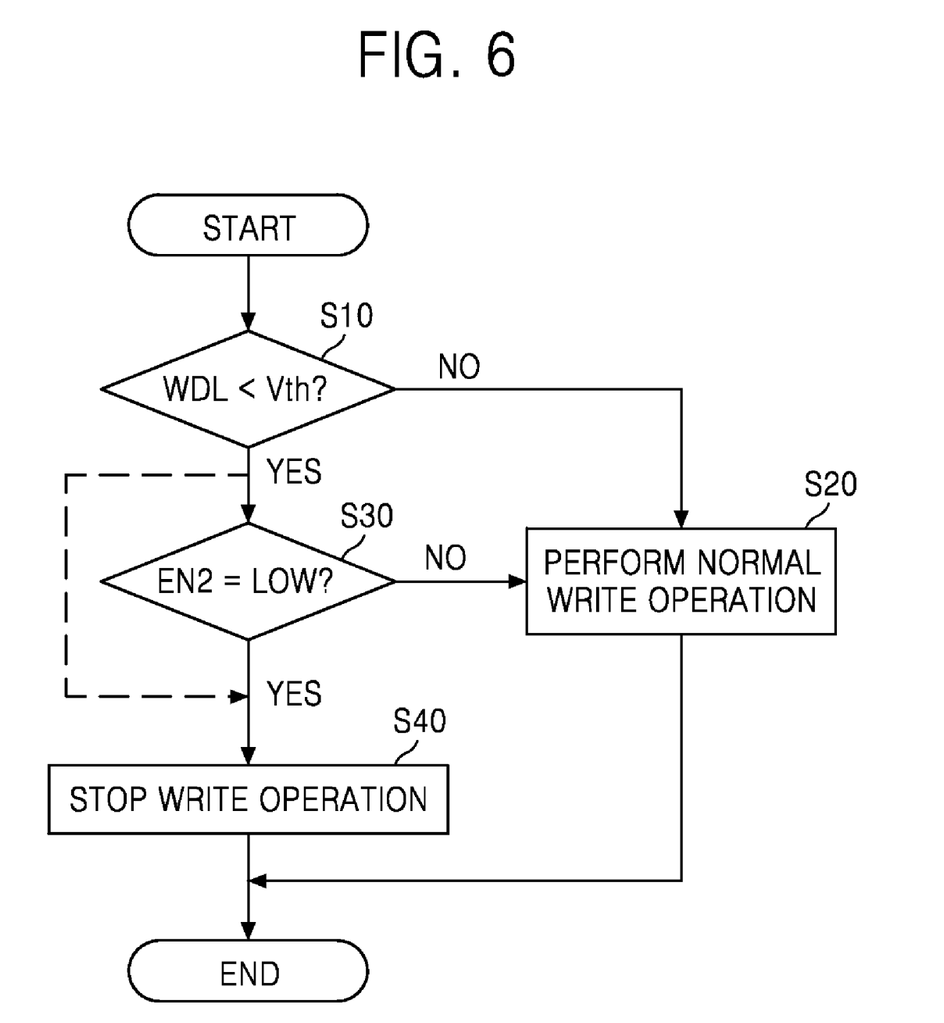
FIG. 6 is a flowchart of a method of operating a pre-amplifier according to one or more exemplary embodiments.

FIG. 6 is a flowchart of a method of operating the pre-amplifier 30 according to an exemplary embodiment. Referring to FIGS. 1 through 6, the comparator 42-5 of the control circuit 42 or 42' compares the difference WDL between the differential signals WDX and WDY with the reference signal Vth in operation S10. When the difference WDL between the differential signals WDX and WDY is higher than the reference signal Vth, the output signals WDX' and WDY' of the driver 44 illustrated in FIG. 2 or the driver 41 illustrated in FIG. 3 are transmitted to the write head and a normal write operation is performed in operation S20.

However, when the difference WDL between the differential signals WDX and WDY is lower than the reference signal Vth, the write control signal DET or EN1 at the high level is transmitted to the driver 44 in FIG. 2 or the switching circuit 42-9 in FIG. 3. At operation S30, the status of the write active signal EN2 is checked. When the write active signal EN2 is at the high level (S30—No), as illustrated in FIG. 5, the output signals WDX' and WDY' of the driver 44 illustrated in FIG. 2 or the driver 41 illustrated in FIG. 3 are transmitted to the write head even when the difference WDL between the differential signals WDX and WDY is lower than the reference signal Vth. As a result, the normal write operation is performed in operation S20. When the write active signal EN2 is at the low level (S30—Yes), as illustrated in FIG. 4, the driver 44 in FIG. 2 or the switching circuit 42-9 in FIG. 3 is disabled, and therefore, the output signals WDX' and WDY' of the driver 44 illustrated in FIG. 2 or the driver 41 illustrated in FIG. 3 are not transmitted to the write head. As a result, the write operation is stopped in operation S40.

Consequently, when the difference WDL between the differential signals WDX and WDY becomes lower or smaller than the reference signal Vth during the write operation, the control circuit 42 or 42' of the pre-amplifier 30 interrupts the transmission of the differential signals WDX and WDY corresponding to the write data DATA, or the signals WDX' and WDY' corresponding to the differential signals WDX and WDY, to the write head. Accordingly, the reliability of the write data DATA is increased in the data processing apparatus 10.

Figure 7:
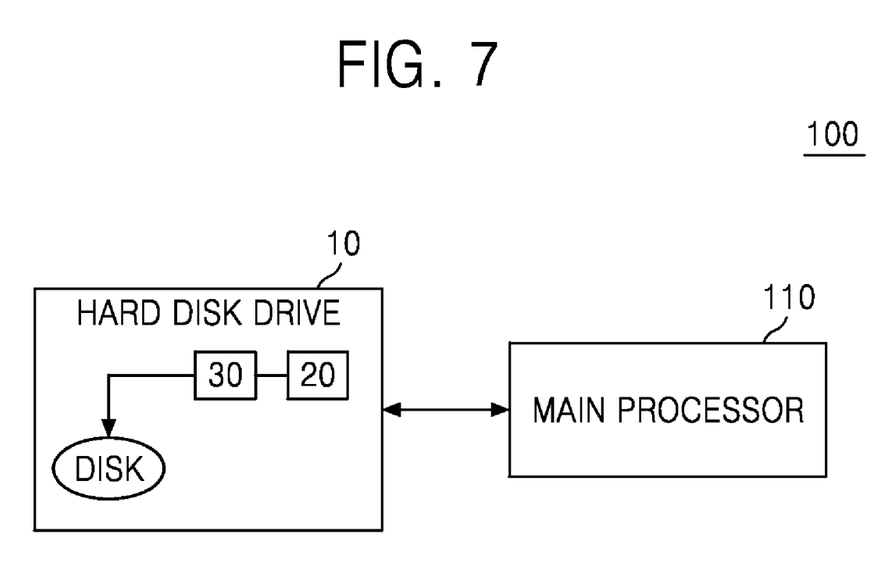
FIG. 7 is a block diagram of a computer system including the data processing apparatus illustrated in FIG. 1 according to one or more exemplary embodiments.

FIG. 7 is a block diagram of a computer system 100 including the data processing apparatus 10 illustrated in FIG. 1 according to an exemplary embodiment. The computer system 100 includes a hard disk drive (HDD) as the data processing apparatus 10 and a main processor 110 controlling the write or read operation of the HDD 10.

Referring to FIGS. 1 through 7, the HDD 10 includes a magnetic recording medium such as a disk, a write head that writes write signals to the magnetic recording medium, and the pre-amplifier 30 providing the write signals to the write head. The pre-amplifier 30 includes a buffer which buffers differential signals corresponding to write data output from the main processor 110 to generate the write signals in compliance with the processor 20. The pre-amplifier 30 also includes the control circuit 42 or 42' which permits or interrupts the transmission of the write signals to the write head according to a result of comparing the difference between the differential signals with a reference signal. The write head may be implemented by a perpendicular magnetic recording (PMR) head. For instance, the technical ideas described with reference to FIGS. 1 through 7 may be applied to an HDD using a PMR head.

Figure 8:
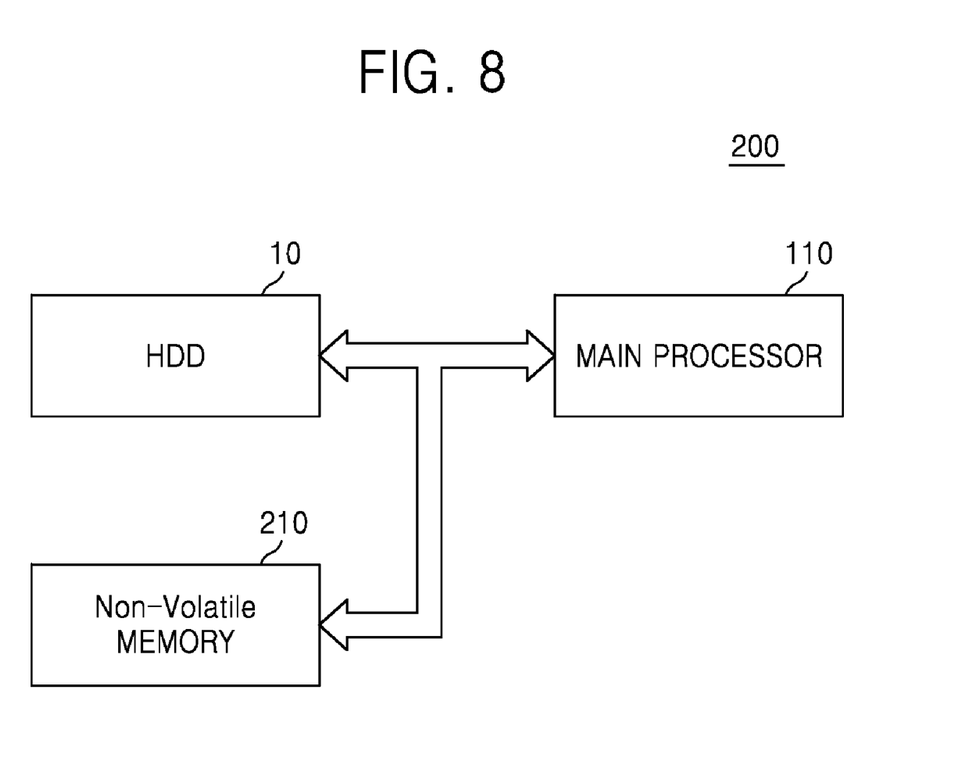
FIG. 8 is a block diagram of a computer system including the data processing apparatus illustrated in FIG. 1 and a non-volatile memory device according to one or more exemplary embodiments.

FIG. 8 is a block diagram of a computer system 200 including the data processing apparatus 10 illustrated in FIG. 1 and a non-volatile memory device 210 according to an exemplary embodiment. The computer system 200 includes a magnetic recording device, i.e., the HDD 10 and an electronic recording device, i.e., the non-volatile memory device 210. When the non-volatile memory device 210 is implemented within the HDD 10, the HDD 10 functions as a hybrid HDD. The non-volatile memory device 210 may include flash memory cells.

The main processor 110 controls the operation of the HDD 10 to write data to a disk of the HDD 10 or read data from the disk. The main processor 110 also controls the operation of the HDD 10 to write data to the non-volatile memory device 210 or read data from the non-volatile memory device 210. When necessary, the main processor 110 may write data to the HDD 10 or the non-volatile memory device 210.

According to an exemplary embodiment, a pre-amplifier may prevent a DC write operation. Accordingly, an HDD including the pre-amplifier may prevent errors from occurring due to the DC write operation and increases the reliability of data.

While exemplary embodiments have been particularly shown and described with reference to the drawings, it will be understood by those of ordinary skill in the art that various changes in forms and details may be made therein without departing from the spirit and scope of the present invention as defined by the following claims.

What is claimed is:

1. A pre-amplifier comprising:
a driver configured to drive differential signals; and
a control circuit configured to generate a write control signal according to a result of comparing a difference between the differential signals with a reference signal, the control circuit including:
a difference detector configured to detect the difference between the differential signals;
a digital-to-analog converter configured to generate the reference signal corresponding to a digital code;
a first comparator configured to generate the write control signal corresponding to the result of comparing the difference output from the difference detector with the reference signal;
wherein the driver is controlled according to the write control signal.

2. A device comprising a pre-amplifier including:
a driver configured to drive differential signals; and
a control circuit configured to generate a write control signal according to a result of comparing a difference between the differential signals with a reference signal,
wherein, if the driver receives a write active signal, the driver is controlled according to the write control signal and the write active signal.

3. The pre-amplifier of claim 1, wherein the control circuit comprises:
a second comparator configured to generate a comparison signal corresponding to the result of comparing the difference output from the difference detector with the reference signal; and
a latch configured to latch the comparison signal to output the write control signal.

4. The pre-amplifier of claim 3, wherein the latch is initialized in response to a read enable signal corresponding to a read operation of the pre-amplifier.

5. A pre-amplifier comprising:
a driver configured to drive differential signals; and
a control circuit configured to control transmission of output signals from the driver to a write head according to a result of comparing a reference signal with a difference between the differential signals,
wherein the control circuit is configured to permit or interrupt the transmission of output signals from the driver to the write head according to the result of comparing the reference signal with the difference between the differential signals.

6. The pre-amplifier of claim 5, wherein the control circuit comprises:
a difference detector configured to detect and output the difference between the differential signals;
a digital-to-analog converter configured to generate and output the reference signal corresponding to a digital code;
a comparator configured to generate a write control signal corresponding to the result of comparing the difference between the differential signals output from the difference detector with the reference signal output from the digital-to-analog converter; and
a switching circuit configured to control the transmission of the output signals of the driver to the write head according to the write control signal.

7. The pre-amplifier of claim 6, wherein the switching circuit controls the transmission of the output signals of the driver to the write head according to a write active signal and the write control signal.

8. The pre-amplifier of claim 5, wherein the control circuit comprises:
a difference detector configured to detect and output the difference between the differential signals;
a digital-to-analog converter configured to generate and output the reference signal corresponding to a digital code;
a comparator configured to generate a comparison signal corresponding to the result of comparing the difference between the differential signals output from the difference detector with the reference signal output from the digital-to-analog converter;
a latch configured to latch the comparison signal output from the comparator to output a write control signal; and
a switching circuit configured to control the transmission of the output signals of the driver to the write head according to the write control signal output from the latch.

9. The pre-amplifier of claim 8, wherein the latch is initialized in response to a read enable signal corresponding to a read operation of the pre-amplifier.

10. The pre-amplifier of claim 8, wherein the switching circuit controls the transmission of the output signals of the driver to the write head according to a write active signal and the write control signal.

11. A hard disk drive comprising:
a magnetic recording medium;
a write head configured to write write signals to the magnetic recording medium; and
a pre-amplifier configured to provide the write signals to the write head, wherein the pre-amplifier comprises:
a driver configured to drive differential signals corresponding to write data to generate the write signals; and
a control circuit configured to control transmission of the write signals to the write head according to a result of comparing a reference signal with a difference between the differential signals, wherein the control circuit is configured to permit or interrupt the transmission of output signals from the driver to the write head according to the result of comparing the reference signal with the difference between the differential signals.

12. The hard disk drive of claim 11, wherein the control circuit comprises:
a difference detector configured to detect and output the difference between the differential signals;
a digital-to-analog converter configured to generate and output the reference signal corresponding to a digital code;
a comparator configured to generate a comparison signal corresponding to the result of comparing the difference between the differential signals output from the difference detector with the reference signal output from the digital-to-analog converter;
a latch configured to latch the comparison signal output from the comparator and output a write control signal; and
a switching circuit configured to control the transmission of the write signals to the write head according to the write control signal output from the latch.

13. The hard disk drive of claim 12, wherein the latch is initialized in response to a read enable signal corresponding to a read operation of the pre-amplifier.

14. The hard disk drive of claim 12, further comprising a processor configured to transmit to the pre-amplifier the digital code that controls a level of the reference signal.

15. A computer system comprising:
a hard disk drive; and
a processor configured to control a write operation of the hard disk drive and output write data,
wherein the hard disk drive comprises:
a magnetic recording medium;
a write head configured to write write signals to the magnetic recording medium; and
a pre-amplifier configured to provide the write signals to the write head, wherein the pre-amplifier comprises:
a driver configured to drive differential signals corresponding to the write data output from the main processor to generate the write signals; and
a control circuit configured to control transmission of the write signals to the write head according to a result of comparing a reference signal with a difference between the differential signals, the control circuit including:
a difference detector configured to detect and output the difference between the differential signals;
a digital-to-analog converter configured to generate and output the reference signal corresponding to a digital code;
a comparator configured to generate a write control signal corresponding to the result of comparing the difference between the differential signals output from the difference detector with the reference signal output from the digital-to-analog converter;
a switching circuit configured to control the transmission of the write signals to the write head according to the write control signal.

16. The computer system of claim 15, further comprising a non-volatile memory device, wherein the main processor controls an operation of the non-volatile memory device.

17. The pre-amplifier of claim 1, wherein the driver transmits the differential signals to a write head of the hard disk drive.

18. The pre-amplifier of claim 17, wherein the driver is enabled or disabled according to the write control signal.

* * * * *